July 9, 1968  A. TOPOUZIAN  3,391,727

DISC TYPE ROTARY HEAT EXCHANGER

Filed Nov. 14, 1966  2 Sheets-Sheet 2

ARMENAG TOPOUZIAN
INVENTOR

BY
John R. Faulkner
Robert E. McCollum
ATTORNEYS

United States Patent Office 3,391,727
Patented July 9, 1968

3,391,727
DISC TYPE ROTARY HEAT EXCHANGER
Armenag Topouzian, Detroit, Mich., assignor to Ford Motor Company, Dearborn, Mich., a corporation of Delaware
Filed Nov. 14, 1966, Ser. No. 594,119
5 Claims. (Cl. 165—9)

ABSTRACT OF THE DISCLOSURE

A rotary heat exchanger rotor comprises a metallic wheel having a hub and a plurality of flat thin spokes extending radially therefrom and defining triangularly shaped openings. The ceramic matrix is formed of sections of mating shape with the triangular openings. The depth of the ceramic sections is less than that of the spokes to allow the spokes to rub against the matrix seals. The spokes have a smaller radial extent than the sections to provide a growth clearance for the sections.

---

This invention relates, in general, to a heat exchanger. More particularly, it relates to a rotary disc type heat exchanger that has the advantages of both metal and ceramic constructions.

Motor vehicle type gas turbine engines invariably include regenerators or recouperators to recapture a portion of the waste heat of the turbine exhaust gases to additionally heat the compressor discharge air prior to entry into the burner section. This provides greater fuel economy and more economical operation of the vehicle.

The present trend is to use a ceramic matrix consisting of, for example, in a rotary regenerator, a cylindrical sandwich of thin circumferentially corrugated strips separated by thin flat ceramic strips to form contiguous axially extending gas flow passages. Low temperature compressor discharge air generally is passed through one half of the matrix as it rotates to absorb the heat previously transferred to the passage walls by the flow of high temperature exhaust gas therethrough during rotation of the matrix through its other half cycle. The above is a known construction.

The use of ceramic for the matrix passages is advantageous not only because of its ability to withstand higher temperatures than most metal constructions, but because of its lower cost as compared to equivalent exotic metallic materials.

There are, however, several disadvantages to the use of ceramic material alone for the matrix of a heat exchanger. The thin passage wall thickness and the brittle material properties of ceramic cause easy erosion or chipping of the exposed matrix faces when rubbing against the stationary mating seals provided to separate the high and low pressure sections of a rotary disc type regenerator. Also, the natural porosity of the ceramic material causes considerable air leakage from the high to low pressure regions of the regenerator. Furthermore, the low thermal expansion properties of ceramic make it difficult to attach metal positive drive parts to the matrix, such as, for example, metallic ring gears commonly used to drive the regenerators.

The invention eliminates the above basic problems in the following manner. First, the invention provides a regenerator consisting of a metallic wheel having radially extending spokes providing essentially triangular shaped openings each of which receive a matingly shaped ceramic matrix section. The spoke elements are flat and wider than the main portion of the ceramic wedges so that the stationary gas seal members rub against the metallic strut edges and not the matrix face portions. This reduces if not eliminates erosion or chipping of the exposed ceramic matrix faces.

Secondly, each of the triangle-shaped ceramic wedges is separated by a non-porous metal strut or spoke, and is enclosed by seals, thus eliminating leakage from the high to low pressure regions.

Thirdly, the ceramic wedges are secured together by a spring loaded metallic chain that is secured to the wedges by spring clips. The clips dampen any shock loading as well as thermal loading created by the combination of dissimilar material. Furthermore, since the matrix is generally located in the high pressure area of the engine, all pressure loads act towards the hub of the matrix and thus eliminate outward pressure forces on the rim of the metallic wheel.

It is a primary object of the invention, therefore, to provide a heat exchanger of the rotary disc type that combines the advantages of both ceramic and metallic heat exchanger constructions.

It is a further object of the invention to provide a heat exchanger construction that permits growth of the parts during operation without inducing large stresses on the parts.

It is a still further object of the invention to provide a rotary disc type heat exchanger consisting of a metallic wheel having a hub and a plurality of flat thin spokes extending radially therefrom to define triangular shaped openings adapted to receive matingly shaped ceramic matrix sections; the major portion of each of the ceramic sections being narrower in depth than the width of the spokes so that the spoke edges rub against the cooperating stationary annular seals, and of a greater radial length than the spokes to permit radial growth of the spokes when the matrix is hot.

Other objects, features and advantages of the invention will become apparent upon reference to the succeeding detailed description thereof, and to the drawing illustrating the preferred embodiment thereof, wherein.

The figures show a rotary disc type heat exchanger or regenerator consisting, in general, of a metallic spoked wheel tiltably and rotatably mounted upon a barrel-shaped center support, and pie-shaped ceramic wedges inserted between the spokes and enclosed by a chain driving member flexibly connected to and enclosing the ceramic wedges.

Figure 1:
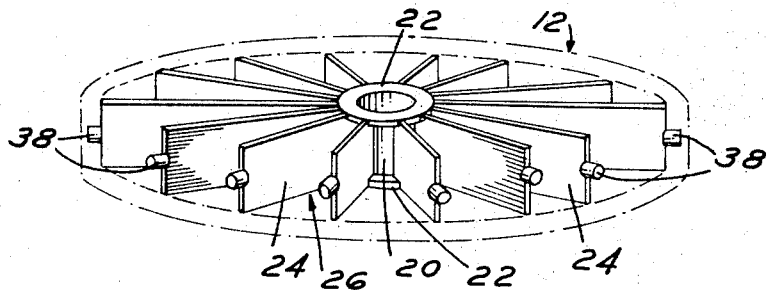
FIGURE 1 shows, isometrically, a rotary disc type heat exchanger embodying the invention.

More specifically, FIGURE 1 shows the metallic core of the regenerator. It includes a sleeve hub 20 having thin annular metal flanges 22 at opposite axial edges. The flanges axially locate a plurality of equally spaced flat thin metal spokes or struts 24 that extend radially from hub 20 and are suitably secured to it, such as by welding, for example.

Figure 4:
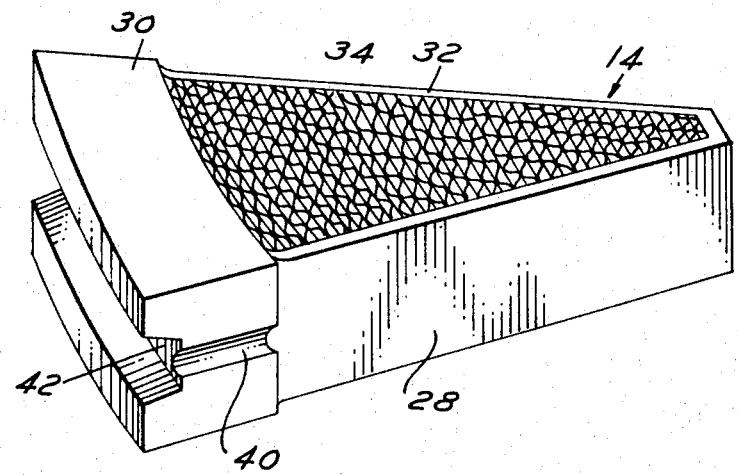
FIGURE 4 is another view, with parts broken away, of FIGURE 1, showing additional details; and, FIGURE 5 is an enlarged view of a detail of FIGURE 4.

Each of the essentially triangular or wedge shaped openings 26 between adjacent spokes removably receives a matingly shaped ceramic wedge section 14, shown in FIGURE 4. Each of the wedge sections consists of a thin triangular shaped ceramic shell 28 integral at its outer periphery with an axially and circumferentially larger cast ceramic end section 30. The shell 28 is filled with a ceramic matrix section 32. The matrix section consists of a sandwich of alternating corrugated and flat ceramic strips defining continuous but separate axially extending gas flow passages 34 open at opposite ends.

Figure 2:
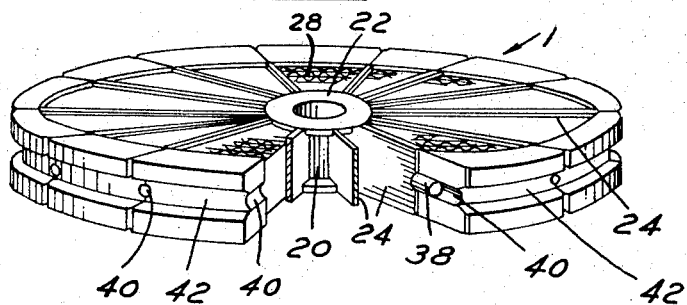
FIGURES 2 and 3 show disassembled portions of the heat exchanger of FIGURE 1.
Figure 3:
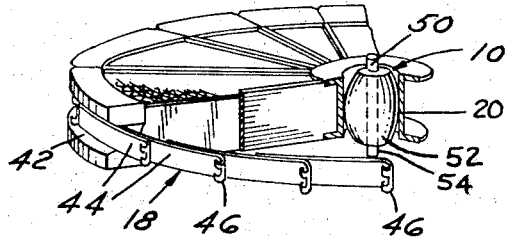

Referring now to both FIGURES 2 and 3, the struts 24 each have an end projection consisting of a tube or pin 38 that cooperates with a semicylindrical recess 40 in opposite faces of ceramic portion 30. It will be seen from a consideration of FIGURE 2 that each of outer sections 30 is circumferentially wider than the shell portion 28 to which it is attached and slightly longer radially than spokes or struts 24 to provide a clearance space between adjacent ceramic sections. This not only permits accommodation of the metallic struts or spokes, but enables the sides of the outer portions 30 to abut each other or be contiguous to form, in effect, a continuous outer annular rim. It will be clear, therefore, that the adjacent semicylindrical recesses 40 together define a cylindrical opening receiving a tube or pin 38 therein to thereby space and locate each of the ceramic wedge sections.

As thus far described, therefore, it will be seen that, since the metallic struts or spokes 24 are of less radial extent than the ceramic wedge portions 30, radial growth of the struts can occur without inducing stresses in the structure. It will also be seen that, since both the ceramic end portion 30 and the struts or spokes 24 are wider than the thickness of ceramic matrix portions 32, the stationary gas seals normally cooperating with a construction of this kind will rub againt the faces of the seal portion 30 and the edges of metallic struts 24 and not against the faces of the ceramic matrix portions 32. This eliminates erosion of the edges of the ceramic passages.

Figure 5:
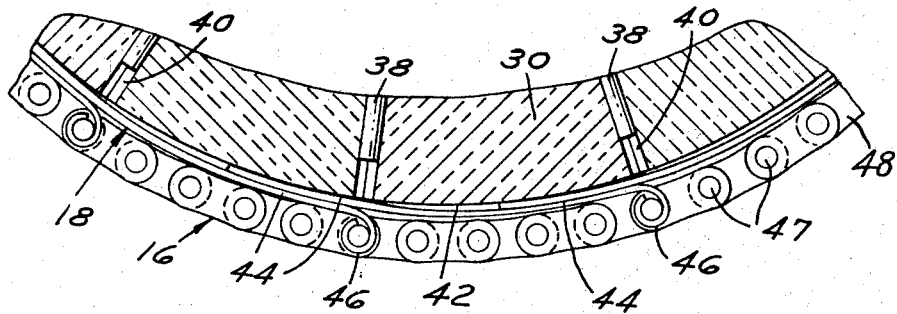

Referring now to FIGURES 3, 4 and 5, the ceramic wedge outer portions 30 are formed with a circumferentially extending groove 42 in which are secured flexible clip members 44. The clips extend circumferentially in the overlapping manner shown in FIGURES 3 and 5. Each clip has a hooked end 46 adapted to engage, in this case, one of the pins 47 on an annular chain drive member 48, shown in FIGURE 5. As stated previously, the spring clips dampen any shock loading as well as thermal loading created by the combination of the metallic and ceramic materials.

The chain 48, in this case, initially would be preheated and then assembled to the clips to provide a shrink fit upon cooling. The chain could be driven by any suitable means, such as, for example, a sprocket gear.

FIGURE 3 shows the manner of mounting the regenerator structure for rotation as well as a cocking or angular tilting action. More specifically, sleeve hub 20 of the metallic spoked wheel is pressed over an essentially barrel-shaped center support member 52 that is rotatably mounted on a stationary shaft 54. This latter shaft could be the same as one supporting the stationary seal members cooperating with the regenerator faces.

In general operation, the regenerator would be located near the gas turbine engine compressor discharge section so that, for example, the left-hand peripheral edge and lower left half portion of the regenerator (FIGURE 2) is subjected at all times to the high pressure, low temperature compressor discharge air. This air would enter the axially extending ceramic passages on the lower left-hand side and discharge into a suitable duct sealingly connected to the upper left-hand side. The upper right-hand side would have a ducted, sealed connection to receive the low pressure, high temperature turbine exhaust gases in the matrix passages, which would discharge out the lower right-hand side of the axial passages into a duct.

Thus, as the regenerator is rotated by the chain through one-half of its cycle, heat is transferred from the exhaust gases to the passage walls on the right-hand side of the regenerator. This heat is then transferred to the lower temperature, higher pressure discharge air when the regenerator rotates through the other half of its cycle. Since at this time, high pressure compressor discharge air is acting on the lower left-hand face of the regenerator while the lower pressure exhaust gases are acting against the upper right-hand face of the regenerator, a cocking or angular tilting force is imposed upon the regenerator, tending to tilt it about its center support bearing. With the use of the barrel-shaped center support, this tilting is permitted, thereby minimizing distortion stresses acting on the regenerator.

The circumferential distance between the spokes or struts 24 preferably should be less than the width of the stationary cross arm seal (not shown) to eliminate leakage through the ceramic pie section.

From the foregoing, it will be seen that the invention provides a rotary disc type regenerator having features of both a metallic and a ceramic type heat exchanger, eliminating the porosity and brittleness and low thermal expansion disadvantages of an all ceramic construction.

While the invention has been illustrated in its preferred embodiment in the drawing, it will be clear to those skilled in the arts to which the invention pertains that many changes and modifications may be made thereto without departing from the scope of the invention.

I claim:

1. A heat exchanger of the disc type comprising, in combination, a metallic wheel member having a hub and a pluarlity of spokes extending radially and defining wedge shape openings between said spokes, ceramic matrix sections of a mating shape secured within said openings and each having a ceramic outer rim circumferentially contiguous to the rim of an adjacent section, and means for securing said wheel member and sections together as a unit, said spokes having a radial length less than the radial extent of said sections to define a spoke radial growth clearance space between said sections and said spokes.

2. A heat exchanger of the disc type comprising, in combination, a metallic wheel member having a hub and a plurality of spokes extending radially therefrom and defining wedge shape openings between said spokes, ceramic matrix sections of a mating shape secured within said openings and each having a ceramic outer rim circumferentially contiguous to the rim of an adjacent section, and means for securing said wheel member and sections together as a unit, said spokes each having lateral edges extending axially beyond the edges of said sections whereby said spoke edges constitute gas seal rubbing surfaces, said spokes each having a radial length less than the radial extent of said sections to define a spoke radial growth clearance space between said sections and spokes.

3. A heat exchanger of the rotary disc type comprising in combination, a metallic wheel member having a sleeve hub and a plurality of flat thin sheet metal spoke elements secured to said hub and extending radially outwardly therefrom, said spoke elements being circumferentially spaced to define essentially triangular shaped openings therebetween, a ceramic matrix section of a mating shape removably mounted in each of said openings, and means circumferentially enclosing the outer peripheral portions of said sections and securing said sections to said wheel, said sections extending radially farther than said spoke elements to define clearance spaces between adjacent edges of adjacent sections for the radial growth of said elements without interference with said sections, said spoke elements having lateral edges extending axially beyond the adjacent edges of said sections whereby said spoke element edges constitute gas seal rubbing edges, said hub having radially extending flange means at opposite axial edges enclosing and axially locating the inner ends of said elements, pin means secured to the outer edge of each of said spoke elements and extending radially therefrom, and aperture means formed in circumferentially adjacent edge portions of said sections receiving said pin means therein to locate and space said sections between said spoke elements.

4. A heat exchanger as in claim 3, the outer peripheral edge portions of said sections extending circumferentially beyond the spoke openings whereby said latter section portions together form an essentially continuous annular outer peripheral surface.

5. A heat exchanger as in claim 3, including bearing means within and rotatably mounting said hub, said means circumferentially surrounding said sections comprising annular drive means for rotating said heat exchanger.

References Cited

UNITED STATES PATENTS

| | | | |
|---|---|---|---|
| 2,852,233 | 9/1958 | Hryniszak | 165—9 |
| 2,981,521 | 4/1961 | Evans et al. | 165—7 |
| 3,024,005 | 3/1962 | Dore et al. | 165—9 |
| 3,209,058 | 9/1965 | Hazzard | 165—10 X |

FOREIGN PATENTS

| | | |
|---|---|---|
| 684,797 | 12/1952 | Great Britain. |

ROBERT A. O'LEARY, *Primary Examiner.*

MEYER PERLIN, *Examiner.*

A. W. DAVIS, *Assistant Examiner.*